United States Patent
Nelson et al.

[15] 3,692,895
[45] Sept. 19, 1972

[54] METHOD OF REDUCING HYPERCHOLESTEREMIA IN HUMANS EMPLOYING A COPOLYMER OF POLYETHYLENEPOLYAMINE AND A BIFUNCTIONAL SUBSTANCE, SUCH AS EPICHLOROHYDRIA

[72] Inventors: Norman A. Nelson, Galesburg, Mich. 49053; Gary E. VandenBerg, Plant City, Fla. 33566

[22] Filed: Sept. 8, 1970

[21] Appl. No.: 70,567

Related U.S. Application Data

[63] Continuation-in-part of Ser. No. 737,365, June 17, 1968, abandoned.

[52] U.S. Cl. .................... 424/78, 424/298, 424/299, 424/240
[51] Int. Cl. ............................................. A61k 27/00
[58] Field of Search .........................................424/78

[56] References Cited

UNITED STATES PATENTS

| | | | |
|---|---|---|---|
| 2,644,760 | 7/1953 | Schroeder | 106/28 |
| 3,152,188 | 10/1964 | Kirkpatrick et al. | 260/584 |
| 3,308,020 | 3/1967 | Wolf et al. | 167/65 |
| 3,332,841 | 7/1967 | Ainsworth et al. | 167/55 |
| 3,383,281 | 5/1968 | Wolf et al. | 167/65 |

FOREIGN PATENTS OR APPLICATIONS

| | | |
|---|---|---|
| 628,821 | 9/1949 | Great Britain |
| 860,303 | 2/1961 | Great Britain |

*Primary Examiner*—Jerome D. Goldberg
*Assistant Examiner*—Allen J. Robinson
*Attorney*—John Kekich and Roman Saliwanchik

[57] ABSTRACT

Compositions and processes are provided for lowering hypercholesteremia in mammals and birds. Oral administration to affected mammals and birds supplies an effective amount of a cholesterol-lowering substance. The cholesterol-lowering substance is a non-toxic cross-linked copolymer of a polyethylenepolyamine and a bifunctional substance containing halogen atoms and/or epoxy groups.

8 Claims, No Drawings

METHOD OF REDUCING HYPERCHOLESTEREMIA IN HUMANS EMPLOYING A COPOLYMER OF POLYETHYLENEPOLYAMINE AND A BIFUNCTIONAL SUBSTANCE, SUCH AS EPICHLOROHYDRIA

CROSS REFERENCE TO RELATED APPLICATION

This application is a continuation-in-part of pending application Ser. No. 737,365, filed June 17, 1968, now abandoned.

BRIEF SUMMARY OF THE INVENTION

This invention relates to compositions and processes for combatting and reducing hypercholesteremia in affected mammals, for example, humans; animals such as dogs; and birds such as chickens. The compositions and processes utilize an orally effective amount of a nontoxic polymer prepared from a polyethylenepolyamine such as tetraethylenepentamine and a bifunctional substance such as epichlorohydrin or 1,2:3,4-diepoxybutane.

DETAILED DESCRIPTION

In accordance with the manner and process of using the present invention, a sufficient amount of a cholesterol-lowering agent is orally administered to affected mammals and birds to provide beneficial effects in lowering cholesterol in said mammals, for example, humans; animals such as dogs; and birds such as chickens. The cholesterol-lowering agent can be administered as such, or suitably after compounding into unit dosage forms with a nontoxic, compatible, edible oral carrier, e.g., an aqueous vehicle. The polyethylenepolyamines used in preparing the copolymers are those of the ethylenediamine series containing from two to about 10 ethylene units, the molecular weight ranging from about 103 to an average molecular weight of about 450. A lower member of the series, diethylenetriamine, molecular weight about 103, is usually available commercially in both pure and commercial grades. Triethylenetetramine, tetraethylenepentamine, pentaethylenehexamine, and the higher homologs are usually available as commercial grades containing aliphatic and also some cyclic polyethylenepolyamines. See, for example, the disclosure of mixed residues containing up to about 10 alkylene groups in U.S. Pat. No. 3,152,188. Commercially available polyethylenepolyamines are derived, for example, from the reaction of ethylene dichloride and ammonia or the controlled polymerization of ethyleneimine. Jones, et al., J. Org. Chem. 9:125–147 (1944) describe the polymerization of ethyleneimine by catalysts such as acids, boron trifluoride and ammonia. Polyethylenepolyamines therein described include diethylenetriamine, triethylenetetramine, tetraethylenepentamine, heptaethyleneoctamine, nonaethylenedecamine, as well as higher molecular weight polymers with lesser amounts of amino nitrogen. Gause et al., J. Amer. Chem. Soc. 73:5,457 (Nov. 1951 describe purification of tetraethylenepentamine on an ion exchange column. Hutchinson et al., J. Am. Chem. Society 67:1966 (Nov. 1945 describe formation of diethylenetriamine, triethylenetetramine, tetraethylenepentamine and similar compounds of higher molecular weights, the latter being found in an "amine residue" after removal of the lower members by distillation. Ionescu and Anghelescu, Chem. Abstracts 64:1,357 (1966) describe gas chromatographic analysis of polyethylenepolyamines which indicates that ethylenediamine, diethylenetriamine, triethylenetetramine, tetraethylenepentamine and pentaethylenehexamine are usually present in mixtures. Polyalkylenepolyamines are also described and used in U.S. Pat. Nos. 2,644,760 and 3,152,188. Those described in U.S. Pat. No. 2,644,760 are polyamines of the ethylenediamine series and include, for example, tetraethylenepentamine, triethylenetetramine, diethylenetriamine, pentaethylenehexamine, and the like. Those described in U.S. Pat. No. 3,152,188 include diethylenetriamine, triethylenetetramine and tetraethylenepentamine in pure form or as mixtures, and higher polyalkylenepolyamine homologs which are usually marketed as mixed residues containing up to approximately 10 alkylene units.

Polyethyleneimines are described and used in U.S Pat. Nos. 3,308,020 and 3,332,841. The former have an average molecular weight of about 30,000 and those in U.S. Pat. No. 3,332,841 have an average molecular weight of from about 800 to about 100,000. However, in the present invention, a molecular weight range of from about 103 (diethylenetriamine) to an average molecular weight of about 450 includes those polyethylenepolyamines useful for the preparation of cross-linked copolymers administered orally. The aforesaid polyethylenepolyamines are available as marketed products of various suppliers such as Dow Chemical Company, Industrial Chemical & Dye Company Union Carbide, Aldrich Chemical Co., and Eastman Kodak. Typically supplied commercial tetraethylenepentamine (Union Carbide) has nominal values as follows: apparent specific gravity, 20/20° C., 0.9980; boiling point 760 mm., 340° C. (decomposes); completely soluble in water; flash point, ASTM method D92, Cleveland Open Cup, 365° F.

In order to prepare the copolymers for the invention process, such polyethylenepolyamines are copolymerized and cross-linked with bifunctional compounds having epoxy groups and/or halogen atoms; for example, epichlorohydrin, glycerol-1,3-dichlorohydrin, 1,2:3,4-diepoxybutane, bis-epoxypropyl ether, ethylene glycol bis-epoxypropyl ether and 1,4-butanediol bis-epoxypropyl ether according to known methods; for example, those of British Pat. No. 628,821; U.S. Pat. No. 3,002,823; Peterson and Sober, J. Am. Chem. Soc. 78:751–755 (1956), and McKernan and Ricketts, Chemistry and Industry, November 21, 1959 pgs. 1,490–1,491. Illustratively, with epichlorohydrin as cross-linking agent the copolymer contains cross-links represented by $-CH_2CHOHCH_2-$; with 1,2:3,4-diepoxybutane by $-CH_2CHOHCHOHCH_2-$; with bis-epoxypropyl ether by $-CH_2CHOHCH_2OCH_2CHOHCH_2-$. Similarly, with ethylene glycol bis-epoxypropyl ether the copolymer contains cross-links represented by $-CH_2CHOHCH_{2d}{}^{OCH}{}_2OCH_2CHOHCH_2-$, and in the case of 1,4-butanediol bis-epoxypropyl ether by $-CH_2CHOHCH_{2d}{}^{O(CH}{}_2)_4OCH_2CHOHCH_2-$. Hence, these copolymer cross-linked products contain a residue of an aliphatic radical having three to ten carbon atoms inclusive. The content of cross-linking moiety expressed as percent by weight of the copolymer is at least 10 percent, preferably at least 14 percent, and reaches in some cases 47 percent or higher. Both the acid addition salt and free base forms of the cross-linked copolymer are operable in the present compositions and processes. Illustratively, a pharmaceutically acceptable hydrochloric acid addition salt form is prepared by controlling the amounts of the polyethylenepolyamine and bifunctional reactant and using calculated amounts of base, e.g., sodium hydroxide, in adjusting the reaction mixture — for example, 20 moles of tetraethylenepentamine, 50 moles of epichlorohydrin and 50 moles of sodium hydroxide provide a cross-linked copolymer in the form of a partial hydrochloride. Alternately, an acid addition salt is prepared from an aqueous solution or dispersion of a free base copolymer by adjustment with the desired acid, such as phosphoric, citric, sulfuric, and the like. For example, 650 Gm. of free base copolymer of tetraethylenepentamine and epichlorohydrin and 75 Gm. of sulfuric acid provide a copolymer partial sulfate. Illustratively, free base forms are usually prepared by adding excess alkali, e.g., sodium hydroxide, to the reaction mixture of a particular amine and bifunctional reactant, thus obtaining an alkaline aqueous dispersion of the free base. Washing with distilled or deionized water until the washings are free of the acid ion and free of alkali provides the base which is dried at about 80° C. and milled to a uniform granular solid.

The polymer suitably prepared as required or desired with an edible oral carrier into an oral dosage from is administered in varying amounts depending upon the weight of the mammals and birds under treatment. In the case of affected human subjects having hypercholesteremia, the total daily dosage ranges from about 2 Gm. to about 100 Gm., preferably from about 10 Gm. to about 15 Gm. The preferred regimen of the oral administration is three to four times daily. The individual dosage amount ranges from about 0.5 Gm. to about 25 Gm., usually q.i.d. about 2.5 Gm. to about 3.75 Gm. Suitably the active ingredient is reduced to a particle size of no more than about 50 microns. Oral administration of the polymers provides a method of binding bile acids and combatting hypercholesteremia which is free of the unsatisfactory and unacceptable taste and/or odor which usually accompany methods utilizing, for example, too oily vehicles or quaternary ammonium ion exchangers based on polystyrenes with divinylbenzene moieties.

The term "edible oral carrier" means the diluents, excipients, aqueous vehicles, oily vehicles, binders, disintegrators, and lubricants, such as calcium carbonate, lactose, calcium phosphate, water, fruit juice, vegetable juice, safflower oil, talc, starch, magnesium stearate, and the like, used by those skilled in the art in preparing oral dosage forms and products such as hard and soft capsules, gels, magmas, powders, dispersions, solutions, emulsions, suspensions, granules, and coated and uncoated tablets. It also means animal and bird rations containing the usual dietary ingredients, that is, carbohydrate, fat, mineral, proteins and vitamins; for example, the diet for cockerels, Tenant et al., Proc. Soc. Exp. Biol. Med. 96:679 (1957) and similar rations for dogs.

Additional active ingredients, while not necessary to the embodiments of the inventive concept, can suitably be added thereto, for example, unsaturated fatty acids such as linoleic acid, arachidonic acid and linolenic acid; edible vegetable oils such as corn oil and safflower oil, choleretic agents such as tocamphyl and florantyrone; fecal softeners such as poloxalkol and dioctyl sodium sulfosuccinate; other hypocholesteremic agents such as the D-isomer of 3,3',5-triiodothyronine, triiodothyropropionic acid; thyroxine-like compounds such as sodium L-thyroxine and sodium D-thyroxine; nicotinic acid, clofibrate, nafoxidine hydrochloride, 5-methylpyrazole-3-carboxylic acid and 3-methyl-5-isoxazolecarboxylic acid.

PREPARATION 1

Heat is applied carefully to a mixture of 38 Gm. of tetraethylenepentamine, 400 ml. of water and 19 ml. of epichlorohydrin until the exothermic reaction subsides. An additional 19 ml. of epichlorohydrin is added dropwise and the resulting mixture is heated and stirred at 60° C. for 2 hours. The mixture is cooled and basified to pH 8.5 using concentrated aqueous potassium hydroxide solution, then heated again for 1 hour. The mixture is cooled, basified to pH 11 with aqueous potassium hydroxide solution and then dialyzed in cellulose casings for 1.5 days. The resulting solution is acidified to pH 6 with concentrated hydrochloric acid. The mixture is concentrated on a rotating evaporator and the resulting residue is dried in vacuo at 70° C. The product is pulverized in a Waring Blendor to yield 51 Gm. This material swells in the presence of water, but does not dissolve.

Preparation 2

In another preparation, 114 Gm. of tetraethylenepentamine in 1,000 ml. of water is treated with 117 ml. of epichlorohydrin at room temperature for 1 hour and at 95° C. for 3.5 hours. The pH of the cooled mixture is adjusted to about 4.25 with 24 ml. of concentrated hydrochloric acid and the adjusted solution is dialyzed. By concentration of the dialyzed solution there is obtained 250 Gm. of copolymer solution containing 49.4 percent copolymer by weight.

PREPARATION 3

A mixture of tetraethylenepentamine and epichlorohydrin is polymerized in water solution as in Preparation 2. The pH of the cooled mixture is adjusted to 12 with aqueous potassium hydroxide solution and the resulting solution is dialyzed as described in Preparation 1. To provide a sulfuric acid addition salt, the pH of the dialyzed aqueous solution of copolymer-free base is adjusted to a pH of about 7 with sulfuric acid. The adjusted solution is concentrated, dried, and pulverized as in Preparation 1, thus yielding a partial sulfate salt.

PREPARATION 4

To a solution of 189 Gm. (1 mole) of tetraethylenepentamine in 1500 ml. of water is added 2 moles of 1,2:3,4-diepoxybutane in portions so as to control the exothermic reaction. The solution is then heated at 80°–100° C. for 2–5 hours. The mixture is cooled and dialyzed to remove unwanted low molecular weight material. The aqueous solution is adjusted to pH about 7 with hydrochloric acid to prepare a copolymer hydrochloride.

PREPARATION 5

In a like manner to Preparation 4, but replacing the tetraethylenepentamine with an equivalent weight of pentaethylenehexamine, the latter is copolymerized with 2.5 moles of 1,2:3,4-diepoxybutane to give the corresponding copolymer.

PREPARATION 6

A solution of 76 Gm. of tetraethylenepentamine, 800 ml. of water and 39 ml. of epichlorohydrin is stirred at room temperature for one hour and at 90° C. for an additional hour, then cooled to 30°–40° C. Sodium hydroxide (15 Gm) in 30 ml. of water is added followed by 39 ml. of epichlorohydrin. The mixture is again stirred at room temperature for 1 hour and at 90° C. for 1 hour when 15 Gm. of sodium hydroxide in 30 ml. of water is added The mixture is heated on the steam bath for 2 hours to produce a thick jelly. The pH of the mixture is adjusted to 6 with concentrated hydrochloric acid and the copolymer hydrochloride is precipitated using ethanol. The rubbery product is triturated with ethanol (two times), dried in vacuo at 80° C. and the resulting solid is ground to a fine powder using a Waring Blendor, yield 110 Gm.

PREPARATION 7

To a warm solution of 3.78 kg (20 moles) of tetraethylenepentamine in 40 l. of water is added 4.6 kg. (50 moles) of epichlorohydrin. After the exothermic reaction subsides (about one hour), 4 kg of 50 percent aqueous sodium hydroxide solution (50 moles) is added. The resulting gel is transferred to flat trays and air-dried at 80° C. The dry solid is suspended in water, the suspension is filtered, and the filter cake washed with water. The cake is air-dried at 80° C. to 6.8 kg. of copolymer which is then milled to produce a uniform granular solid suitable for use in formulation.

PREPARATION 8

90.5 Gm. of commercial grade pentaethylenehexamine is copolymerized with 109 Gm. of epichlorohydrin. 58.5 Gm. of 50 percent sodium hydroxide solution is added. The reaction yields a copolymer which is partially dried at 80° C. under vacuum. This partially dried product is washed with excess water and then dried to a constant weight of 135 Gm.

PREPARATION 9

The procedure of Preparation 8 is repeated except for substituting the pentaethylenehexamine by 90.5 Gm. of commercial grade triethylenetetramine. A final dry weight of 62 Gm. is obtained with a considerable quantity of fines being lost by decantation.

PREPARATION 10

The procedure and ingredients of Preparation 9 are carried out with a copolymerization period of about 3 hours. An additional amount of 12 Gm. of epichlorohydrin is added and the reaction is continued for 3 hours. Thereafter 64.8 Gm. of 50 percent sodium hydroxide solution is added. Copolymer is obtained with a yield of 114 Gm. final dry weight.

PREPARATION 11

The preceding procedure of Preparation 8 is followed using diethylenetriamine 261 Gm., epichlorohydrin 428 Gm., and sodium hydroxide 229 Gm. A copolymerized product, 450 Gm. is obtained.

PREPARATION 12 - COPOLYMER FREE BASE

700 Gm. of granular solid prepared as in Preparation 7, approximately one in five nitrogen atoms protonated as the hydrochloride, is suspended in 4,000 ml. water containing 95 Gm. of sodium hydroxide and the whole is uniformly mixed. After about 60 minutes the suspension is filtered and the filter cake is washed wit deionized water until the wash water is found free of chloride ion by silver nitrate test and found free of sodium hydroxide by pH test. The filter cake is then dried at about 80° C., yielding 600 Gm. of polymer free base which is milled to produce a uniform granular solid suited for use in formulating orally administered pharmaceutical preparations.

PREPARATION 13 - COPOLYMER FREE BASE

A polymer with approximately two in five nitrogen atoms protonated as the hydrochloride is converted to the free base in a manner similar to Preparation 12. Approximately 160 Gm. of sodium hydroxide is used in converting 800 Gm. of the copolymer hydrochloride.

PREPARATION 14

As in Preparation 7, 370 Gm. of a polyethylenepolyamine containing about 10 ethylene units is copolymerized with 460 Gm. of epichlorohydrin. 200 Gm. of sodium hydroxide is used. The resulting product, easily milled to a granular solid, weighs approximately 600 Gm.

OTHER PREPARATIONS

Additional cross-linked copolymer preparations suited for manufacturing orally administered pharmaceutical preparations are prepared in similar manner to Preparations 1 through 14 by utilizing the other polyethylenepolyamines with the desired bifunctional reactant, for example, epichlorohydrin, glycerol-1,3-dichlorohydrin, 1,2:3,4-diepoxybutane, bis-epoxypropyl ether, ethylene glycol bis-epoxypropyl ether and 1,4-butanediol bis-epoxypropyl ether.

Materials and methods for evaluating the novel preparations and processes of this invention are described by Parkinson, J. of Lipid Research, 8:24–29 (1967). Therein, for example, bile acid-binding capacity, expressed as milliequivalents per Gm., can be determined by adding a weighed amount of a polymer to a 1 percent solution of bile acid in 0.9 percent saline at pH 6.2. The mixture is well shaken, centrifuged and the supernatant separated for determination of cholic acid.

Decreases in the cholic acid content show effective bile acid-binding capacity. Cockerels made hypercholesterolemic by a diet to which 2 percent of cholesterol is added are used to determine serum sterol lowering effects when the diet is supplemented with known amounts of the active polymers. Example 1 Effect of Tetraethylenepentamine-Epichlorohydrin Copolymer Hydrochloride in Cholesterol-Fed Cockerels

| Regimen | Weight Gain (Gm./Bird) | Food Intake (Gm./Bird) | Wt.Gain Food Intake | Serum Sterols (mg./100 ml.) |
|---|---|---|---|---|
| Basal Diet | 86 | 176 | .49 | 146* |
| +2% Cholesterol | 87 | 195 | .45 | 307 |
| +0.5% Copolymer (143A) | 85 | 183 | .46 | 197 |
| +0.5% Copolymer (142A) | — | — | — | 242** |
| +0.5% Copolymer (142B) | 91 | 205 | .44 | 283 |
| +1% Copolymer (143A) | 91 | 186 | .49 | 140 |
| +1% Copolymer (142A) | 85 | 179 | .47 | 166 |
| +1% Copolymer (142B) | 83 | 187 | .44 | 219 |
| +3% Copolymer (143A) | 84 | 171 | .49 | 113 |
| +3% Copolymer (142A) | 73 | 151 | .48 | 130 |
| +3% Copolymer | 80 | 190 | .42 | 126 |

*6 birds/group in all groups except**
**5 birds/group

Male beagles are fed 300 Gm. of standard laboratory chow per day containing 3,000 milligrams of copolymer hydrochloride, control animals being fed the same chow without the copolymer. Serum lipids are determined colorimetrically after an overnight fast and individual serum sterols are analyzed by gas liquid chromatography. The administration of the copolymer hydrochloride shows a reduction of serum total sterols, triglycerides and phospholipids by 59 percent, 61 percent, and 61 percent respectively, compared to controls. Such cholesterol-lowering effect is also confirmed in normo-lipidemic beagles at doses of 500, 1,000, and 2,000 milligrams per kilogram daily in long term studies. In hyperlipidemic male human patients with serum cholesterol values above 250 milligrams per 100 milliliters, the compositions of the present invention lower cholesterol levels about 20 percent for as long as 36 weeks when compared with a group receiving unmedicated placebo. The dose of the active ingredient varies from about 4 to about 5 Gm., administered three times daily, in the form of an aqueous dispersion.

EXAMPLE 2 Capsule

One thousand two-piece hard gelatine capsules for oral use, each containing 500 mg. of tetraethylenepentamine-epichlorohydrin copolymer (Preparation 1) are prepared from the following ingredients:

| | |
|---|---|
| Tetraethylenepentamine-epichlorohydrin copolymer | 500 gm. |
| Talc, U.S.P. | 50 gm. |
| Magnesium Stearate, U.S.P. | 2 gm. |

The finely powdered ingredients are mixed thoroughly, then filled into hard gelatin capsules of appropriate size.

Two capsules are taken four times a day with meals and an evening snack to lower blood cholesterol in hypercholesteremic patients.

EXAMPLE 3 POWDER PACKETS

Ten thousand powder packets, each containing 3,75 Gm. of a tetraethylenepentamine-epichlorohydrin copolymer (preparation 7) are prepared from the following:

| | |
|---|---|
| Tetraethylenepentamine-epichlorohydrin copolymer | 37,500 Gm. |

One or two packets emptied and stirred into water, fruit or vegetable juices, skimmed milk, or mixed with cereal, applesauce or other food, is given four times daily in the relief of severe pruritis associated with bile stasis such as in biliary cirrhosis with incomplete biliary obstruction.

EXAMPLE 4 OIL BASE SUSPENSION

One thousand ml. of an oral suspension containing 750 mg. of tetraethylenepentamine-diepoxybutane copolymer (dry powder) in each 5 ml. is prepared from the following ingredients:

| | |
|---|---|
| Tetraethylenepentamine-diepoxybutane copolymer | 150 gm. |
| Oil Base, q.s. | 1,000 ml. |

The oil base consists of equal parts of soybean oil and purified linseed oil gelled with 1 percent aluminum monostearate. Each 5 ml. of base supplies 1.1 ml. of linolenic acid. One or two teaspoonful (5 or 10 ml.) administered three times a day with meals is useful in the treatment of atherosclerosis.

EXAMPLE 5 AQUEOUS DISPERSION

An aqueous oral dispersion, containing in each tablespoon (15 ml.) 1,000 mg. of a polyethylenepolyamine-epichlorohydrin copolymer (Preparation 14), is prepared from the following materials:

| | |
|---|---|
| Polyethylenepolyamine-epichlorohydrin Copolymer | 1,000 gm. |
| Pectin, N.F. | 100 gm. |
| Deionized water, q.s. | 15,000 ml. |

One tablespoon (15 ml.) is given three times a day, with meals, to lower blood cholesterol in hypercholesteremic individuals.

EXAMPLE 6 POWDER PACKETS

Five thousand powder packets, each containing 25 Gm. of polyethylenepolyamine-epichlorohydrin copolymer, are prepared from 125,000 Gm. of the polymer (preparation 14).

One packet emptied and dispersed into an aqueous vehicle such as water, fruit or vegetable juice, skimmed milk, or the like is taken four times daily to reduce the serum sterol levels in hypercholesteremic patients.

EXAMPLE 7

Similar capsules, powder packets, oil base suspensions and aqueous dispersions useful in reducing hypercholesteremia, are prepared as in Examples 2 through 6, utilizing the other preparations as disclosed in preparations as disclosed in Preparations 1 through 14.

We claim:

1. A method of reducing hypercholesteremia in an affected human which consists essentially of orally administering to said human an effective nontoxic amount for reducing hypercholesteremia in said human of a member selected from the group consisting of the free bases and pharmaceutically acceptable acid addition salts of a cross-linked copolymerization product of (a) a polyethylenepolyamine containing from about two to about 10 ethylene units and having a molecular weight of from about 103 to an average molecular weight of about 450 and (b) a second member selected from the group consisting of epichlorohydrin, glycerol-1,3-dichlorohydrin, 1,2:3,4-diepoxybutane, bis-epoxypropyl ether, ethylene glycol bis-epoxypropyl ether and 1,4-butanediol bis-epoxypropyl ether wherein said product contains by weight from about 10 percent to about 47 percent of said second member.

2. The method of claim 1 wherein the polyethylenepolyamine is tetraethylenepentamine and the second member is epichlorohydrin.

3. The method of claim 1 wherein the cross-linked copolymer is administered in the form of an aqueous dispersion.

4. The method of claim 1 wherein the polyethylenepolyamine is diethylene triamine and the second member is epichlorohydrin.

5. The method of claim 1 wherein the polyethylenepolyamine is triethylenetetramine.

6. The method of claim 1 wherein the second member is epichlorohydrin.

7. The method of claim 1 which includes tocamphyl or florantyrone as an additional active ingredient.

8. The method of claim 1 which includes clofibrate as an additional active ingredient.

* * * * *

UNITED STATES PATENT OFFICE
CERTIFICATE OF CORRECTION

Patent No. 3,692,895     Dated September 19, 1972

Inventor(s) Norman A. Nelson, Gary E. VandenBerg

It is certified that error appears in the above-identified patent and that said Letters Patent are hereby corrected as shown below:

Page 1, Title, for "EPICHLOROHYDRIA" read -- EPICHLOROHYDRIN --. Column 1, line 6, for "EPICHLOROHYDRIA" read -- EPICHLOROHYDRIN --; lines 64-65, for "73:5,457 (Nov. 1951" read -- $\underline{73}$:5457 (Nov.) 1951; line 67, for 67:1966 (Nov. 1945" read -- $\underline{67}$:1966 (Nov.) 1945--. Column 2, line 65, for "$CH_2CHOHCH_2{}_dOCH_2CHOHCH_2$" read -- $CH_2CHOHCH_2OCH_2OCH_2CHOHCH_2$ --; line 67, for "$CH_2CHOHCH_2d-O(CH_2{}_4OCH_2CHOHCH_2$" read -- $CH_2CHOHCH_2O(CH_2)_4OCH_2CHOHCH_2$ --. Column 6, line 24, for "wit" read -- with --. Column 7, line 29, for "Copolymer" read -- Copolymer (142B) --. Column 8, line 8, for "3,75" read -- 3.75 --.

Signed and sealed this 20th day of February 1973.

(SEAL)
Attest:

EDWARD M. FLETCHER, JR.     ROBERT GOTTSCHALK
Attesting Officer           Commissioner of Patents